Dec. 12, 1967   R. J. KERSTING   3,358,097

FLUID PRESSURE INDICATING MEANS

Filed July 21, 1966

INVENTOR
RAYMOND J. KERSTING
BY
William R. O'Meara

United States Patent Office

3,358,097
Patented Dec. 12, 1967

3,358,097
FLUID PRESSURE INDICATING MEANS
Raymond J. Kersting, Dellwood, Mo., assignor, by mesne assignments, to Wagner Electric Corporation, a corporation of Delaware
Filed July 21, 1966, Ser. No. 566,924
13 Claims. (Cl. 200—82)

ABSTRACT OF THE DISCLOSURE

In a driver warning valve, a piston movable to operate a switch in response to a predetermined differential between the magnitudes of separate fluid pressures applied thereto, and damping means for damping surges of relatively high magnitudes and short duration in the separately applied fluid pressures to impede movement of said piston in response to said surges.

---

Figure 1:
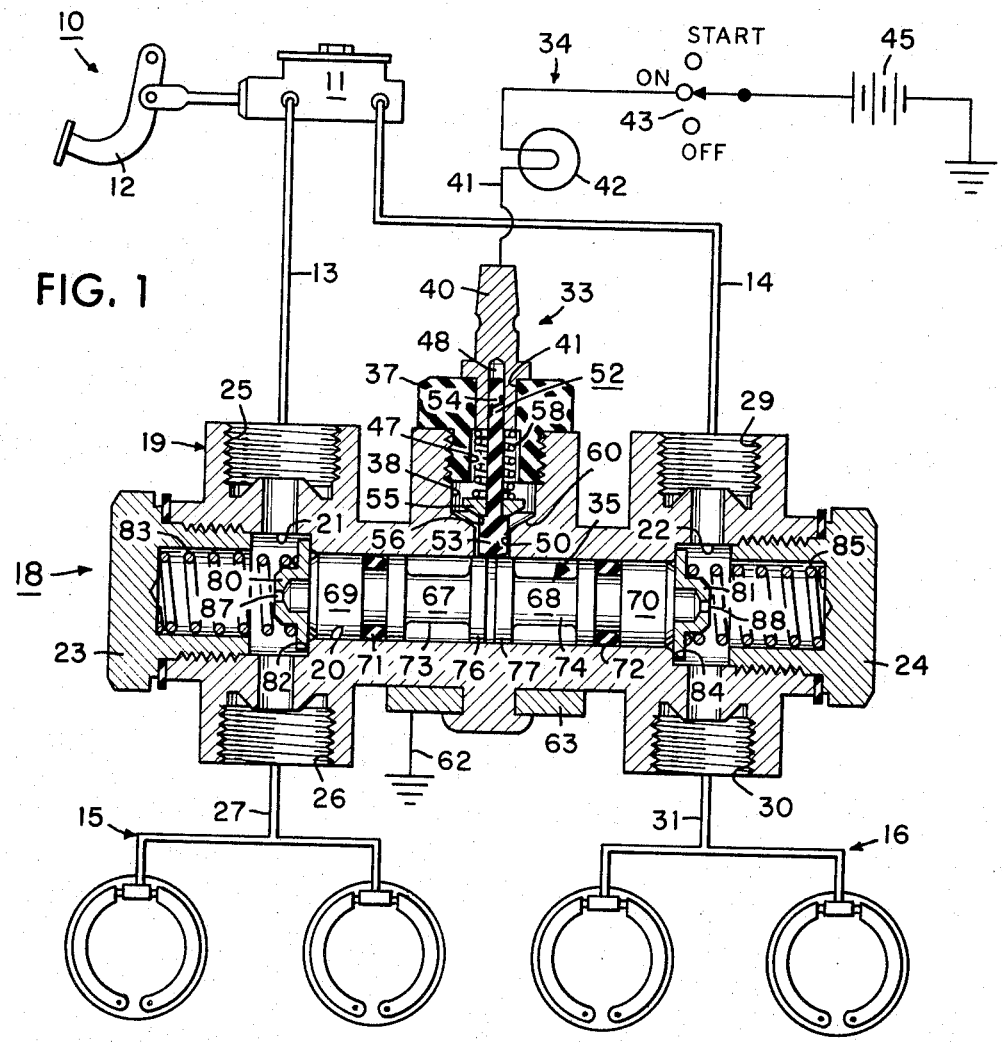

This invention relates to fluid pressure indicating means and more particularly to fluid pressure responsive switch means for connection in a fluid pressure system having a plurality of fluid pressure branches.

In a fluid pressure system, for example, in a vehicle hydraulic braking system of the split type utilizing a dual master cylinder, the front and rear sets of wheel brakes are supplied fluid pressure through a pair of fluid pressure branches connected to the dual master cylinder. Should one set of wheel brakes become inoperable because of a pressure drop or failure in one of the branches, due for example to a break in a fluid pressure line in that branch, the wheel brakes connected to the other branch will continue to be operable. In such systems it is highly desirable to provide means for warning the vehicle operator that a pressure failure has occurred in one of the system branches.

It is therefore a general object of the present invention to provide novel fluid pressure responsive indicating means for connection in a fluid pressure system.

Another object of the present invention is to provide novel fluid pressure responsive indicating means for connection in a system having a plurality of fluid pressure branches and which includes means for signaling an undesirable drop in fluid pressure in one of the branches.

Still another object is to provide novel indicating means for connection in a vehicle having a dual hydraulic braking system for substantially simultaneously and independently supplying fluid pressure to a pair of fluid pressure branches connected to different brake assemblies wherein the indicating means includes novel switch means actuated to a closed circuit condition to energize signal means in response to a predetermined pressure differential between the branches, and wherein the switch means, after actuation, remains in the closed condition until manually reset.

Another object is to provide indicating means of the aforesaid type which is especially simple and economical to manufacture and which is highly reliable in operation.

Still another object is to provide novel fluid pressure differential responsive switch means for connection in a fluid pressure braking system having a pair of substantially simultaneously and independently operated fluid pressure branches for effecting energization of signal means in response to a predetermined loss of fluid pressure in either branch.

These and other objects and advantages of the present invention will become apparent hereinafter.

Briefly, in accordance with the present invention, a control valve is provided with control means movable toward opposed translated positions in response to a sustained differential between separate fluid pressures applied thereto, and other means for damping surges in the separate fluid pressures to impede movement of said control means toward its translated position in response to said surges.

Figure 2:
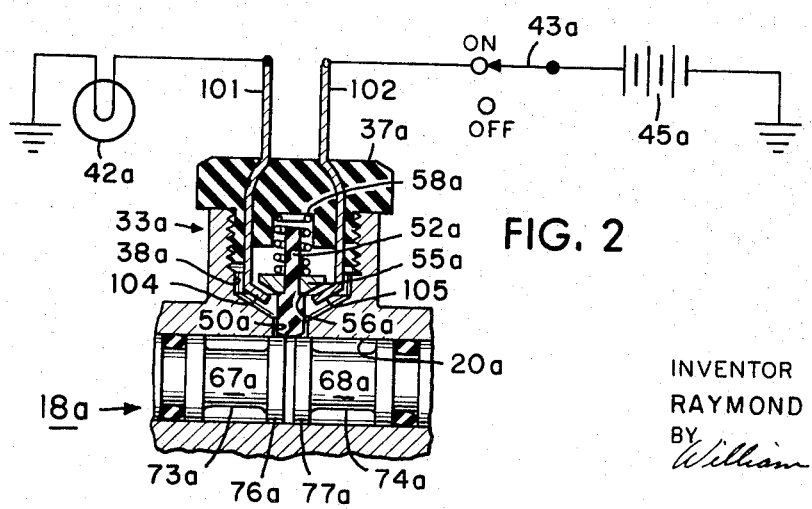

In the drawing which illustrates embodiments of the invention,

FIG. 1 is a diagrammatic view of a brake system of a vehicle including an enlarged sectional view of indicating means according to the present invention, and FIG. 2 is a fragmentary sectional view illustrating indicating means of modified construction.

Referring now to FIG. 1, a split or dual fluid pressure vehicle braking system 10 is illustrated which includes a dual hydraulic master cylinder 11 shown as a conventional tandem master cylinder having a brake pedal 12 operatively connected thereto. As is well known in the art, a tandem master cylinder, such as master cylinder 11, usually includes a primary piston responsive to the force applied to the brake pedal to pressurize fluid in a primary pressure generating chamber connected to one set of wheel brakes, and a secondary piston movable in response to the fluid pressure in the primary chamber to pressurize fluid in the secondary pressure generating chamber that is connected to a different set of wheel brakes. One of the main advantages of employing a tandem master cylinder is, of course, that fluid pressure is supplied to the different sets of wheel brakes substantially simultaneously and independently. Thus, during a braking application, if brake actuating fluid pressure is not generated in the primary pressure chamber, due for example to a break in a fluid line or conduit connected therewith, the force applied to the brake pedal will be mechanically transmitted to the secondary piston to provide brake actuating pressure in the secondary chamber for actuating the set of wheel brakes associated therewith. On the other hand, if brake actuating fluid pressure is not generated in the secondary pressure chamber during a braking application, the pressure generated in the primary pressure chamber will effect operation of the set of wheel brakes associated therewith.

A pair of fluid conduits 13 and 14 are connected respectively to the outlet ports of the primary and secondary fluid pressure chambers of the master cylinder 11 for supplying fluid pressure, for example, to front and rear sets of wheel brakes 15 and 16, respectively. Each of the wheel brakes is diagrammatically illustrated as including a hydraulic wheel cylinder and a pair of brake shoes adapted to be operated thereby.

Indicating or control means 18, constructed in accordance with the principles of the present invention, includes a housing 19 having a longitudinal central bore 20 and a pair of counterbores or pressure chambers 21 and 22 at the opposite ends and in aligned relation with the central bore 20. The outer ends of the pressure chambers 21 and 22 are closed by a pair of plug members 23 and 24 threadedly received therein. The pressure chamber 21 is provided with an inlet port 25 connected to the conduit 13 and an outlet port 26 connected to conduit 27 that is also connected to the front set of wheel brakes 15. The pressure chamber 22 has an inlet port 29 connected to the conduit 14 and an outlet port 30 connected to the rear set of wheel brakes 16 by means of conduit 31. The pressure chambers 21 and 22 provide continuous fluid pressure communication between the master cylinder 11 and the wheel brake sets 15 and 16.

The indicating means 18 includes electric switch means, indicated generally at 33, connected in an electric signal circuit 34, and differential pressure responsive switch actuating means 35 disposed in the bore 20 and movable in response to a predetermined pressure differential between the chambers 21 and 22 to actuate switch means 33.

In the illustrated embodiment of FIG. 1, the switch means 33 includes a removable closure or plug member 37 of suitable insulating material, such as plastic, which is threadedly received in a chamber or socket 38 formed in the housing 19 centrally thereof. A metal terminal 40 is mounted, such as by a press-fit, in an opening 41 extending through the plug 37. The external end of terminal 40 is electrically connected by a lead 41 to one side of electrical signal means, shown as a signal lamp 42, and the lamp 42 is preferably mounted in view of the vehicle operator, such as on the vehicle dashboard. The other side of lamp 42 is connected through a vehicle ignition switch, indicated diagrammatically at 43, to one side of the vehicle battery 45 which has its other side connected to ground or the vehicle chassis. The plug 37 is provided with an internal socket 47 which intersects with a bore 48 formed in the inner end of terminal 40. The housing 19 is provided with a radial bore 50 which intersects bore 20 centrally thereof and which connects with the socket 38. The radial bore 50 is coaxial with sockets 38 and 47 and the bore 48 in the terminal 40. A resiliently urged switch operating member 52 is shown as an elongated member of suitable insulating material, such as plastic, having an enlarged end portion 53 reciprocally or radially movable in the housing cross-bore 50 for engagement with the switch actuating means 35 and an opposed end portion 54 extending in the bore 48 of terminal 40 and guided for radial movement therein. Switch operating member 52 carries an annular electrical contact member 55 which is shown concentrically disposed thereon in engagement with an annular flange or shoulder 56 of the enlarged end portion 53 of the operating member 52. Disposed concentrically on the operating member 52 and engaged between the internal end of the terminal 40 and the contact member 55 is a switch operating spring 58 which urges the contact member 55 and the operating member 52 toward the bore 20. The contact member 55 has a lower annular inclined or beveled surface which is engageable with a complementary shaped annular inclined or beveled wall portion 60 of socket 38 adjacent the radial bore 50. The housing 19 is grounded, as indicated at 62, that is, it is electrically connected to the grounded side of battery 45. The housing 19 may be grounded, as shown in FIG. 1, by use of a mounting plate 63 connected to the housing 19 and secured, such as by bolts (not shown), to any suitable portion of the vehicle which is grounded. When the contact member 55 contacts the beveled wall portion 60, the terminal 40 is grounded or connected through spring 58 and contact member 55 to the grounded housing 19. Thus, in the construction of FIG. 1, the wall portion 60 serves as an electrical contact of the switch means 33.

The differential pressure responsive switch actuating means 35 is disposed in the bore 20 and movable in response to a predetermined pressure differential between the pressure chambers 21 and 22 for actuating switch means 33. Switch actuating means 35 includes a pair of like piston members 67 and 68 and which are slidably disposed in bore 20 in sealing engagement therewith and which are concertedly movable in response to a predetermined pressure differential between the chambers 21 and 22. Pistons 67 and 68 are provided with enlarged ends 69 and 70 respectively adjacent the pressure chambers 21 and 22 and responsive to fluid pressure supplied thereto, said ends being respectively provided with fluid pressure seals 71 and 72 in sealing engagement with their respective pistons and the bore 20. The pistons 67 and 68 are also provided with intermediate annular grooves or recessed portion 73 and 74 of smaller diameter than the enlarged ends 69 and 70, and annular abutment means 76 and 77 at the adjacent ends thereof which are normally engaged with the switch operating member 52 at the center of bore 20 to maintain the switch means 33 in an open circuit condition. The abutment means 76 and 77 are of larger diameter than the recessed portions 73 and 74 and aid in guiding the pistons 67 and 68 during movement thereof.

A pair of like resiliently urged stop members or plates 80 and 81 are respectively disposed in the pressure chambers 21 and 22. Stop member 80 is resiliently urged toward engagement with an annular flange 82 at the intersection of bore 20 and chamber 21 by a spring 83. Spring 83 is disposed in chamber 21 and caged between the stop member 80 and plug member 23. Similarly, the stop member 81 is resiliently urged toward engagement with an annular flange 84 at the intersection of bore 20 and chamber 22 by a spring 85 caged between the stop member 81 and plug member 24. Stop member 80 is provided with a passage or opening 87, and stop member 81 is provided with a passage or opening 88 so that the effective end areas of the pistons 67 and 68 are respectively responsive to the pressures in the chambers 21 and 22. The effective areas of pistons 67 and 68 are shown equal.

Under normal operating conditions, when the brake pedal 12 is depressed to apply the brakes 15 and 16, the fluid pressures in chambers 21 and 22 are substantially equal so that equal and opposite pressures act on the pistons 67 and 68. Thus, the pistons 67 and 68 remain in the positions shown in FIG. 1 with the periphery of the abutments 76 and 77 thereof engaged with the lower end of the switch operating member 52 to maintain the contact member 55 disengaged or spaced from the grounded wall portion 60. Under these conditions, the switch 33 is in its open circuit condition and the signal lamp 42 is unenergized.

Should the depression of brake pedal 12 during a braking application fail to produce actuating fluid pressure in chamber 21, due for example to a break in a fluid conduit, such as conduit 13, there will be a fluid pressure differential between the chambers 21 and 22 so that the applied fluid pressure in the chamber 22 acting on the effective area of the piston 68 therein will effect concerted movement of both pistons 67 and 68 leftwardly against stop member 80 and the force of spring 83, piston 67 entering chamber 21. This leftward movement of pistons 67 and 68 will move the abutments 76 and 77 out of engagement with switch operating member 52 so that the switch operating spring 58 will move the member 52 downwardly into the space in bore 20 provided by the recessed portion 74 of piston 68. This movement of the operating member 52 effects movement of contact member 55 into engagement with the beveled wall surface 60 of the housing 19 so that switch 33 is in its closed circuit condition. Under these conditions, current flows from battery 45 through signal lamp 42, ignition switch 43, terminal 40, switch operating spring 58 and contact 55 to the grounded housing 19 to thereby energize the lamp 42. The leftward displacement of the pistons 67 and 68 from their normal positions is limited by the engagement of the stop member 80 with the right end of plug member 23. When the pedal 12 is released to eliminate the applied fluid pressure in the chamber 22, the force of spring 83 acting on stop member 80 will urge pistons 67 and 68 rightwardly; however, the right side of the abutment 77 of piston 68 will lockingly engage the left side of switch operating member 52 and prevent the pistons from returning to their normal positions. The lower end portion 53 of member 52 will be disposed in bore 20 in the recessed portion 74 of piston 68 and thereby maintain the contact member 55 in contact with the beveled wall surface 60 and the lamp 42 energized. The illumination of lamp 42 will warn the vehicle operator that a fluid pressure failure has occurred and that only one set of wheel brakes is operational.

Should depression of the pedal 12 during a braking application fail to produce actuating fluid pressure in chamber 22, due for example to a break in a fluid conduit, such as conduit 14, there will be a fluid pressure differential between the chambers 21 and 22 such that the applied fluid pressure acting on the effective area of the piston 67 in the chamber 21 will effect concerted movement of both of the pistons 67 and 68 rightwardly against stop member 81 and the force of spring 85, piston 68 entering chamber 22. This movement of pistons 67 and 68 will move the abutments 76 and 77 out of engagement with switch operating member 52 so that the switch operating spring 58 will move said member downwardly into the space in bore 20 provided by the recessed portion 73 of piston 67. The contact member 55 will engage the beveled wall surface 60 to close switch 33 so that current from battery 45 will flow through the signal lamp 42, ignition switch 43, terminal 40, spring 58, and contact 55 to the grouded housing 19. This rightward displacement of pistons 67 and 68 from their normal positions is limited by the engagement of stop member 81 with the left end of plug member 24. When the brake pedal 12 is released to eliminate the applied fluid pressure in the chamber 21, the force of spring 85 will urge the pistons 67 and 68 leftwardly but the left side of abutment 76 will lockingly engage the right side of operating member 52 and pistons 67 and 68 will be prevented from returning to their original positions. The contact member 55 will thus remain in engagement with the housing surface 60 to maintain the signal lamp 42 on or energized.

After a pressure failure has occurred, the signal lamp 42 will light each time the ignition switch is turned to its "on" position since the switch 33 remains in its closed circuit condition, as hereinbefore explained, until it is manually reset. The switch 33 is readily reset and returned to its open circuit condition by merely removing the plug 37 and lifting the switch operating member 52 upwardly out of the bore 20. This upward movement of member 52, of course, frees the pistons 67 and 68 so that they can return from their displaced positions to their normal positions shown in FIG. 1.

In a split or dual fluid pressure system utilizing a dual master cylinder, such as a tandem master cylinder, there may be momentary, surge-type or peaking pressure differentials in excess of a desired or predetermined value between the applied fluid pressures in the two branches connected thereto, and such momentary differentials are apt to be effected when the brakes are applied quickly, such as during a "panic" stop. This is because pressure generated in the secondary pressure chamber of a conventional tendem master cylinder generally lags that in the primary chamber since the secondary master cylinder piston moves in response to the pressure in the primary chamber.

In the indicating means 18 movement of the pressure responsive means 35 from the normal position thereof is opposed by the resiliently urged stop members 80 and 81 so that any minor fluid pressure differentials between the chambers 21 and 22 will not result in actuation of switch means 33 and a false signal from lamp 42. Furthermore, the relatively small orifices or restricted openings 87 and 88 in members 80 and 81 provide pressure fluid flow restrictions between the pressure generating chambers of master cylinder 11 and the pressure responsive piston ends 69 and 70 to provide a damping or time delay effect. This time delay effect prevents switch actuating displacement movement of the pistons 67 and 68 and a false indication of system failure that otherwise might occur because of the afore-mentioned momentary difference between the pressures generated by the master cylinder during a "panic" brake application or the like. While the restrictions are preferably provided for by openings 87, 88 in members 80, 81, such orifices or fluid flow restricted openings could be provided between the inlets 25, 29 and the ends 69, 70 of the pistons 67, 68 in the chambers 21, 22, such as for instance, in the housing at or near the housing inlets 25, 29 if desirable.

The pressure responsive means 35 economically consists of pistons 67 and 68 with the adjacent annular abutments 76 and 77 thereof serving as the abutment means of the pressure responsive means 35 that normally maintain the operating member 52 in a contact disengaged position. The annular grooves 73 and 74 of the pistons serve as recesses on opposite sides of the abutment means for receiving the end portion of the operating member 52 upon the occurrence of predetermined pressure differentials between the fluid pressures in chambers 21 and 22.

In FIG. 2, pressure differential responsive indicating means is shown at 18a which is similar in construction and operation to the indicating means 18, FIG. 1, except that the switch means indicated at 33a is of modified construction. Switch means 33a includes a plug member 37a of insulating material threadedly received in a housing socket 38a which has a pair of stationary electrical contact members 101, 102 extending therethrough. Contact members 101 and 102 have external ends connected in series circuit relation between a grounded signal lamp 42a and the "on" position contact of an ignition switch 43a which, in turn, is connected to one side of a vehicle battery 45a having its opposite side grounded. Contact members 101, 102 have lower internal end portions 104 and 105 inclined toward each other and serving as electrical contacts. A resiliently urged switch operating member 52a has one end disposed in a radial bore 50a intersecting a longitudinal bore 20a. Operating member 52a is normally engaged with abutments 76a and 77a of fluid pressure differential responsive pistons 67a and 68a slidable in bore 20a. Electrical contact member 55a is concentrically disposed on member 52a in engagement with a shoulder 56a formed on member 52a. Spring 58a is disposed between the inner side of plug member 37a and the contact member 55a to urge the contact member 55a toward engagement with the end portions 104, 105 of contacts 101, 102 and the lower end of member 52a toward bore 20a.

The pistons 67a and 68a are provided with annular grooves or recessed portions 73a and 74a, respectively, which provide spaces in bore 20a such that upon movement of the pistons 67a and 68a in either direction in response to a predetermined pressure differential between the fluid pressure branches or a pressure failure in one of the branches of the system, the lower end of member 52a will move downwardly into the bore 20a. Movement of member 52a into the bore 20a under such conditions will effect movement of contact member 55a into engagement with both contact end portions 104, 105 to electrically interconnect them and complete the signal lamp circuit with the battery 45a to thereby energize signal lamp 42a. The lower end of member 52a will remain in bore 20a with the pistons 67a and 68a displaced from their normal positions after a pressure failure to maintain the signal lamp 42a energized until the switch 33a is manually reset, such as by removing plug 37a and lifting the member 52a upwardly to its normal position.

It will now be apparent that there has been provided improved fluid pressure indicating means meeting the objects and advantages set out hereinbefore, as well as others, and that it will be obvious to those skilled in the art that various changes and modifications can be made without departing from the true spirit of the invention, the scope of which is limited only by the claims which follow.

The embodiments of the invention in which an exclusive property or privilege is claimed are defined as follows:

1. A fluid pressure responsive control device comprising a housing, switching means movable in said housing, other means reciprocally movable in said housing and controlling said switching means, a pair of opposed fluid pressure responsive portions on said other means and defining with said housing a pair of opposed fluid pressure chambers, a pair of ports in said housing connected with said chambers and spaced from said portions, a pair of resilient means in said chambers for engagement with said portions to oppose movement of said other means, said other means being movable against one of said resilient means toward a position actuating said switching means in response to a sustained predetermined fluid pressure differential between applied fluid pressure at said ports acting on said opposed portions, and a pair of orifice means between said ports and opposed portions to dampen surges in the applied fluid pressure and obviate the switching means actuating movement of said other means in response thereto.

2. Fluid pressure responsive switch means for controlling the energization of an electric signal circuit comprising a housing, a pair of fluid pressure chambers in said housing, a bore in said housing connected between said chambers and defining with said chambers a shoulder adjacent each end of said bore, a pair of ports in said housing respectively connected with said chambers, a radial opening in said housing intersecting said bore centrally thereof, a socket formed in said housing having one end connecting with said opening, first electric contact means disposed in said socket, a switch operating member radially movable in said socket and said opening, spring means in said socket urging said operating member toward said bore, second electric contact means connected with said operating member and movable into engagement with said first contact means in response to switch actuating movement of said operating member from a normal position to a displaced position, a plug member closing the other end of said socket, electric connection means extending through said plug member and having one end electrically connected to one of said contact means and the other end adapted for connection with said signal circuit, movable fluid pressure responsive means disposed in said bore having abutment means thereon normally engaging said operating member for maintaining same in its normal position with said contact means disengaged from each other when said pressure responsive means is in its normal position, said pressure responsive means having a recess on each of the opposed sides of said abutment means for receiving a portion of said operating member, a pair of resiliently urged members respectively disposed in said chambers and urged toward engagement with said shoulders to oppose movement of said fluid pressure responsive means in either direction from its normal position, orifice means in each of said resiliently urged means to provide pressure fluid communication between said chambers and the opposed end portions of said pressure responsive means, said pressure responsive means being movable to a displaced position from its normal position against the force of one of said resiliently urged members in response to a predetermined fluid pressure differential between applied fluid pressures at said ports to effect movement of said abutment means from said operating member and switch actuating movement of said operating member from its normal position to a displaced positon with said portion thereof in one of said recesses to effect engagement between said first and second contact means.

3. The fluid pressure responsive switch means according to claim 2 wherein said first contact means comprises a wall surface of said housing.

4. The fluid pressure responsive switch means according to claim 2 wherein said first contact means comprises a pair of spaced contacts which are interconnected by said second contact means when said first and second contact means are in engagement.

5. The fluid pressure responsive switch means according to claim 2 wherein said pressure responsive means comprises a pair of pistons.

6. The fluid pressure responsive switch means according to claim 2 wherein each of said orifice means is sized to provide a fluid pressure drop thereacross to dampen surges in the applied fluid pressures and obviate switch actuating movement of said operating member in response thereto.

7. A control valve comprising a housing having a pair of ports therein, means movable in said housing between said ports, opposed portions on said means respectively responsive to established fluid pressures at said ports, said means being movable toward opposed translated positions in said housing in response to a sustained predetermined fluid pressure differential between the established fluid pressures at said ports acting on said opposed portions, and a pair of restricted passage means between said ports and opposed portions to respectively dampen surges in the established fluid pressures and impede movement of said first named means toward its translated positions in response thereto.

8. The control valve according to claim 7, comprising a pair of resilient means in said housing for respective engagement with said opposed portions to impede movement of said first named means toward its translated positions in response to fluid pressure differentials between the established fluid pressures at said ports less than the predetermined fluid pressure differential.

9. The control valve according to claim 7, comprising a pair of resiliently urged means in said housing for respective engagement with said opposed portions to impede movement of said first named means toward its translated positions, said resiliently urged means defining with said housing said restricted passage means between said ports, respectively.

10. The control valve according to claim 7, comprising a pair of resiliently urged means contained within said housing for respective engagement with said opposed portions to impede movement of said first named means toward its translated positions, said restricted passage means being respectively provided through said resiliently urged means.

11. The control valve according to claim 7, comprising a bore in said housing connected between a pair of counterbores, said ports being respectively connected with said counterbores, said first named means comprising piston means slidable in said bore, said opposed portions being on said piston means, a pair of shoulder means on said housing between said bore and said counterbores, respectively, a pair of abutment means in said counterbores for engagement with said shoulder means and said opposed portions, a pair of spring means normally urging said abutment means toward engagement with said shoulder means and said opposed portions to impede movement of said piston means toward its translated positions in response to differentials between the established fluid pressures at said ports less than the predetermined differential, and said pair of restricted passage means being respectively provided in said abutment means, the movement of said piston means toward its respective translated positions being against one of said abutment means and one of said spring means to disengage said one abutment means from one of said shoulder means.

12. The control valve according to claim 7, comprising a pair of chambers in said housing adjacent to said opposed portions and connected with said ports, a pair of abutment means in said chambers between said opposed portions and said ports, a pair of resiliently urged means for engagement with said opposed portions and normally engaged with said abutment means to oppose movement of said first named means toward its translated positions in response to differentials between the established fluid pressures less than the predetermined differential, said resiliently urged means defining with said housing said restricted passage means when engaged with said abutment means to dampen the surges in the established fluid pressures, respectively, one of said opposed portions being drivingly engaged with one of said resiliently urged means to effect disengagement thereof from one of said abutment means upon the movement of said first named means toward one of its translated positions.

13. The control valve according to claim 7, comprising switch means in said housing for connection in an electrical circuit to selectively energize a driver warning lamp, an operating member for said switch means movable between switch means energizing and deenergizing positions, positioning means on said first named means normally engaged with said operating means to maintain said operating means in its deenergized position, a pair of locking means on said first named means on opposed sides of said positioning means for respective locking engagement with said operating member, said positioning means being disengaged from said operating member upon movement of said first named means to one of its translated positions, and resilient means in said switch means normally urging said operating member toward engagement with said positioning means and toward its energized position, said operating member being movable into its switch means energizing position to effect energization of said lamp and also into locking engagement with one of said locking means in response to the force of said resilient means when said first named means is moved to its one translated position disengaging said positioning means from said operating member in order to positively retain said first named means in its one translated position.

References Cited

UNITED STATES PATENTS 2,764,176    9/1956    Darquier _____ 303—84
3,228,194    1/1966    Blair _____ 303—84

BERNARD A. GILHEANY, *Primary Examiner.*

H. BROOME, *Assistant Examiner.*